United States Patent [19]

Fishman et al.

[11] Patent Number: 5,451,673
[45] Date of Patent: Sep. 19, 1995

[54] FILMS FABRICATED FROM MIXTURES OF PECTIN AND STARCH

[75] Inventors: Marshall L. Fishman, Lansdale; David R. Coffin, Glenside, both of Pa.

[73] Assignee: The United States of America as represented by the Secretary of Agriculture, Washington, D.C.

[21] Appl. No.: 51,415

[22] Filed: Apr. 23, 1993

[51] Int. Cl.$^6$ .............. C08B 37/02; C08L 3/02; C08L 5/06; C09D 105/06
[52] U.S. Cl. .............. 536/123; 536/2; 536/102; 106/210; 106/212; 106/213; 106/285; 127/29; 127/32; 127/33
[58] Field of Search .............. 536/123, 2, 102, 1, 536/11, 123.1; 524/47; 106/162, 210, 212, 213, 285; 127/29, 32, 33; 523/100, 124

[56] References Cited

U.S. PATENT DOCUMENTS

| | | | |
|---|---|---|---|
| 2,542,052 | 2/1951 | Owens et al. | 536/2 |
| 4,031,200 | 6/1977 | Reif | 424/459 |
| 4,126,502 | 11/1978 | Dabal et al. | 424/452 |
| 4,126,503 | 11/1978 | Gardner | 424/452 |
| 4,129,134 | 12/1978 | Hind et al. | 131/2 |
| 4,165,998 | 8/1979 | Adams et al. | 424/444 |
| 4,180,558 | 12/1979 | Goldberg et al. | 424/443 |
| 4,197,289 | 4/1980 | Sturzenegger et al. | 424/443 |
| 4,332,789 | 6/1982 | Mlodozeniec | 424/443 |
| 4,849,246 | 7/1989 | Schmidt | 424/478 |
| 4,857,331 | 8/1989 | Shaw et al. | 424/440 |
| 5,089,307 | 2/1992 | Ninomiya et al. | 428/35.2 |

FOREIGN PATENT DOCUMENTS 0408503 1/1991 European Pat. Off. .
0680396 8/1939 Germany .

OTHER PUBLICATIONS

Nikitin "The Chemistry of Cellulose and Wood", 1966, Israel Program for Scientific Translations, Jerusalem, pp. 62–71.
Kester et al., *Food Technology*, vol. 12(1), pp. 47–59 (1986).
Averback, B., *Proceedings First International Conference*, pp. 199–209 (1979).
Hosokawa et al., *Ind. Eng. Chem. Res.*, vol. 29, pp. 800–805 (1990).
Heinglein et al., *Chemische Berichte*, vol. 69(B), pp. 309–324 (1936).
Maclay et al., *Chemurgic Digest*, vol. 6(22), pp. 326–329 (1947).
Schultz et al., *J. Colloid Sci.*, vol. 3, pp. 53–62 (1948).
Schultz et al., *J. of Physical and Colloid Chem.*, vol. 53, pp. 1320–1330 (1949).
Otey et al., *Ind. Eng. Chem.*, Prod. Res. Dev. vol. 16(4), pp. 305–308 (1977).
Otey et al., *Ind. Eng. Chem. Res.*, vol. 26, pp. 1659–1663 (1987).

*Primary Examiner*—Nathan M. Nutter
*Attorney, Agent, or Firm*—M. Howard Silverstein; John Fado; Janelle S. Graeter

[57] ABSTRACT

High modulus, flexible films may be fabricated from blends of pectin, starch and, optionally, plasticizers. The films are biodegradable, water soluble and are advantageous in that all materials are derived from agricultural products.

17 Claims, 9 Drawing Sheets

FILMS FABRICATED FROM MIXTURES OF PECTIN AND STARCH

BACKGROUND OF THE INVENTION

1. Field of the Invention

Films made from natural products are of increasing scientific and commercial interest. These films are not only biodegradable but may also be recyclable as well as acceptable for human consumption and pharmaceutical applications. Multiple uses, ease of disposal and the replacement of petroleum-based raw materials with renewable agricultural products make these types of films excellent candidates for commercial development.

This invention relates to novel films fabricated from mixtures of pectin and starch. Plasticizers may also be included in the mixtures in order to increase film flexibility. The films are high modulus, flexible and self-supporting and are advantageous in that all materials are derived from agricultural products.

DESCRIPTION OF THE PRIOR ART

The film-forming properties of several water soluble polysaccharides have been studied. Films useful for coatings made from alginates and carrageenans were disclosed by Kester et al. (*Food Technology*, vol. 12(1), pp. 47–59, 1986). Paper coatings and similar applications of carboxylmethyl cellulose and other cellulose ethers have been investigated, and studies of chitin and chitosan films, including self-supporting films, have also been carried out (Averback, *Proceedings First International Conference*, pp. 199–209, 1979; Hosokawa et al., *Ind. Eng. Chem. Res.*, vol. 29, pp. 309–324, 1990; Wong et al., *UJNR Protein Panel*, 19th Meeting, San Diego, Cal. 1990).

A few studies were carried out on pectin films in the 1930's and 1940's (Henglein et al., *Chemisch Berichte*, vol. 69(B), pp. 309–324, 1936; Henglein et al., German Patent No. 0680396, 1939; Maclay et al., *Chemurgic Digest*, vol. 6(22), pp. 326–329, 1947; Schultz et al., *J. Colloid Sci.*, vol. 3, pp. 53–62, 1948; Schultz et al., *J. of Physical and Colloid Chem.*, vol. 53, pp. 1320–1330, 1949); however, these studies generally involved derivatized pectins used with divalent cations such as calcium. A more recent work discussed blends of pectins and carboxymethyl cellulose for use as cigarette papers (Hind et al., U.S. Pat. No. 4,129,134 1978). U.S. Pat. No. 2,542,052 (issued to H. S. Owens and T. H. Schultz) describes films made from low methoxyl (less than 7.4% methoxyl) pectin cross-linked with polyvalent cations. No other polymeric component was used.

Starch has been investigated as a component in biodegradable films for applications such as agricultural mulch and pharmaceutical caplets (Otey et al., *Ind. Eng. Chem. Prod. Res. Dev.*, vol. 16(4), pp. 305–308, 1977; Otey et al., *Ind. Eng. Chem. Res.*, vol. 26, pp. 1659–1663, 1987; Silibiger et al., European Patent No. 0 408 503A2 1991). Starch forms films only through the use of complexing agents, and these are very water sensitive. Therefore mixture with a substantial amount (e.g., 50%) of a film-forming polymer is required for producing a successful product. Thus, although various types of films formed from a variety of natural products have been studied, none exhibited the advantageous properties of high modulus, flexibility and biodegradability as do the novel films of the invention described herein.

SUMMARY OF THE INVENTION

It has been discovered that high modulus flexible films can be fabricated from pectin having high molecular weight, large radius of gyration and high intrinsic viscosity at an ionic strength of 0.05 or greater mixed with high amylose starch. The films are formed in the absence of divalent cations such as calcium. In addition, plasticizers may optionally be included in the mixtures in order to increase film flexibility.

In accordance with this discovery, it is an object of the invention to provide novel films comprising a blend of effective amounts of pectin, starch and, optionally, plasticizer, which are advantageous in that all materials are derived from agricultural products. No petroleum-based materials are utilized.

It is also an object of the invention to provide a method of making the novel films.

Other objects and advantages of the invention will become readily apparent from the ensuing description.

DETAILED DESCRIPTION OF THE INVENTION

Pectin is one of several film-forming water soluble polysaccharides and there are many agricultural sources of pectin which are currently underutilized. There is potentially a large volume of raw material from which pectin can be obtained since it is a major component of fruits and vegetables and is therefore plentiful in agricultural wastes. Examples of sources from which pectin may be obtained are many kinds of fruits including stone fruits such as peaches, pome fruits such as apples, citrus fruits such as limes, lemons, oranges and grapefruit, vegetables such as sugar beets, cucumbers and squash and nuts such as almonds and sunflower seeds.

Pectins are a class of water soluble complex polysaccharides found in the cell walls of higher plants. The backbone consists predominantly of blocks of poly(-galacturonic acid) residues interrupted by short rhamnose inserts. The galacturonate residues are methyl esterified to varying extents, depending on the plant source. Neutral sugars are present in side chains attached to the backbone. These materials have found extensive use in processed foods as a result of their gelling properties.

Solution properties and shapes of various pectins were determined using high performance size exclusion chromatography, viscometry light scattering, membrane osmometry, nuclear magnetic resonance, electric birefringence, electron microscopy and infrared spectroscopy. Results showed that pectin is a collection of aggregated rigid rods or segmented rods which may aggregate into a gel network. In solution, pectin may contain on average up to four chains per rod or segmented rod. The extended conformation of the molecule, as well as the presence of aggregation in solution, are properties similar to those found in some synthetic polymers, suggesting that pectin films would have desirable physical and mechanical properties.

In previous attempts to fabricate films from pectin, it was not recognized that high molecular weight alone was insufficient criteria to make useful films from pectin blends. In salt-free solutions, low molecular weight pectin fragments tended to form large molecular weight aggregates with low intrinsic viscosity. Low molecular weight, low methoxy fragments also aggregate in the presence of divalent cations, but these aggregates will not make useful films due to the occurrence of cross-linking which prevents flexibility. Furthermore, it was not recognized that water solubility was a desirable property of pectin films.

The particular pectin used is the most important factor in obtaining acceptable film properties. Unlike random coil polymers, pectin molecules are nearly fully extended both in solution and in the solid state. Therefore, extension of the material does not occur by uncoiling, but rather by slippage of the chains past each other and possibly by covalent bond stretching. This may lead to early fracture of the materials if there is little orientation present as a result of the casting method used. Molecular weight, intrinsic viscosity, radius of gyration and degree of methyl esterification of the pectin molecule contribute to a considerable degree to the effectiveness of the pectin. High molecular weight, large radius of gyration and high intrinsic viscosity at an ionic strength of 0.05 or greater will provide a useful, high modulus film. These particular properties can be determined by means well-known to those of skill in the art.

Preferred pectins may be obtained from citrus, especially lime or lemon. Weight average molecular weights of at least about 100,000 are useful; however, above about 150,000 is preferred. Particularly preferred is above about 200,000. A radius of gyration measurement of about 25 mm is acceptable for film-making purposes. The intrinsic viscosity at ionic strength of 0.05 or greater should measure at least about 2.1 dl/g, preferably as high as possible. The degree of methyl esterification should be at least about 50%, preferably about 70%, most preferably about 74%.

While it is possible to cast pure pectin films, the addition of starch has a beneficial effect. In addition to biodegradability, it controls the degree of tackiness of the film. It also significantly lowers the cost of films into which it is incorporated. Varieties of starch high in amylose result in better films since amylose is linear while amylopectin is highly branched.

Conventional starches are useful, however, although starches having an amylose content of about 40% are preferred, while an amylose content of about 50% to about 70% is particularly preferred.

Pectin/starch mixtures produce films having high moduli and thus many uses; however, the films are too brittle for some applications. Plasticizers are therefore added to obtain films which are more flexible and less susceptible to brittle failure. Many plasticizers are known in the art and have been used in other polymer systems. Acceptable plasticizers are glycerine, urea, and poly(alkylene glycols). Preferred are glycerine and urea, while glycerine is particularly preferred.

Selection of an appropriate plasticizer is made according to the ultimate required properties of the film. For example, while glycerine and urea are both useful and effective plasticizers, glycerine is an acceptable food additive, therefore it may be selected for applications where films for human consumption are required.

The novel films of the instant invention have a variety of applications. They are useful as coatings, adhesives, controlled release carriers or food wrappings. Edible films are also contemplated and may be used for such purposes as the fabrication of bags containing soup mixes which are added to boiling water for "instant" soup. A controlled release matrix which is water soluble also has numerous applications. In particular, pharmaceutical preparations may be applied to the skin. Biodegradable materials which are carrier matrices such as tablets or encapsulation materials are also contemplated.

The pectin-based polyblends of this invention can be made into films of varying thicknesses using conventional methods of solution casting and melt forming. Solutions of pectin are mixed with gelatinized starch solutions, cast on a plate using a film applicator and allowed to dry overnight. The films are then vacuum-dried, followed by removal from the coating plates.

Fibers may also be prepared from the blends described herein by wet spinning or dry spinning. Wet spinning involves extruding the blends under tension into a bath which is a coagulant for the components and which extract the water from the coagulated fibers. Optionally, there may be an air gap between the spinneret face and the coagulating bath. Dry spinning involves extruding the blend under tension into a column of heated air to evaporate the water.

Films and fibers may also be prepared by a melt process, which involves mixing the components together with sufficient water to allow the pectin and starch to melt at a temperature below their decomposition temperatures. The blended material is fed to an extruder, extruded under tension through an appropriate die, cooled with air and taken up by an appropriate collection device. For making films, a tubular film can be made with cool air being blown through the center of the tube to both cool the film and to impart a biaxial stress to the film.

The extrusion process can also be used to make other shaped articles by using appropriate dies and molds.

In solution casting, pectin is dissolved in water at room temperature. The rate of dissolution can be increased by heating at 40°–60° C.

The gelatinized starch solution may be prepared by mixing starch with water and heating it above the boiling point of water under pressure for a sufficient time to break down starch granules. The process may be carried out in a microwave bomb, heating in a microwave oven. The solution is then cooled and added to the pectin solution with stirring.

In a preferred embodiment, approximately one gram of pectin was added to about 20 ml of HPLC grade water with stirring. About 0.05 gram to about 0.67 gram of starch was mixed with about 10 ml HPLC grade water in a Parr microwave bomb (from Parr Instrument co,. Moline, Ill.) and heated in a microwave oven for about three minutes at about 50% power. The starch solution was then cooled in a water bath for about 25 minutes and then added to the pectin solution with stirring. The mixtures were then allowed to stir for approximately one additional hour before casting.

Films were prepared by casting them on a LEXAN ® plate using a Microm film applicator (from Paul N. Gardner Co., Pompano Beach, Fla.). After air drying overnight, the samples were vacuum-dried for approximately 30 minutes. Films were removed from the coating plates with a razor blade. Films can also be cast on glass plates.

In accordance with the descriptions provided herein, one of skill in the art can make films having a wide range of properties. Variations in the pectin/starch ratio as well as the optional addition of varying amounts of plasticizer result in films having degrees of brittleness and tackiness as well as flexibility which can be tailored to meet requirements dictated by the ultimate use of a particular film.

The following examples are intended only to further illustrate the invention and are not intended to limit the scope of the invention as defined by the claims.

EXAMPLES

Experiments were carried out to determine the optimum type of pectin to use and the optimum pectin/starch ratio. All samples contained high amylose starch (Amylomaize VII; approximately 70% amylose, 30% amylopectin, from American Maize Co., Hammond, Ind.). Pure pectin samples were run as controls. Two different lime pectins (DM65 [Type 1200] and DM74 [Type 1500], from Grindsted Products, Inc., Kansas City, Kans.) and citrus pectin (DM59, from H. P. Bulmers, Hereford, England) were utilized. The intrinsic vicosities of the samples in 0.05M NaCl and degrees of methyl esterification are shown in Table I. The compositions of the formulations are shown in Table II.

TABLE 1

| Pectin | Intrinsic viscosity, dl/g | % Methyl Esterification |
|---|---|---|
| DM65 | 3.82 | 65% |
| DM74 | 5.27 | 74% |
| DM59 | 1.70 | 59% |

TABLE II

| Pectin | % Pectin | % Starch |
|---|---|---|
| DM59 | 89.9 | 10.1 |
| DM59 | 77.5 | 22.5 |
| DM59 | 65.0 | 35.0 |
| DM65 | 90.1 | 9.9 |
| DM65 | 65.2 | 22.5 |
| DM65 | 65.2 | 34.8 |
| DM74 | 94.9 | 5.1 |
| DM74 | 77.4 | 22.6 |
| DM74 | 59.9 | 40.1 |

Mechanical testing was carried out on a Rheometrics RSA Solids Analyzer (Piscataway, N.J.) using a film testing feature. Air was used for sample chamber temperature control on runs starting from ambient temperature. Liquid nitrogen was used for runs starting below room temperature. A nominal strain of 0.1% was used in all cases, with an applied frequency of 10 rad/sec (1.59 Hz).

Test samples were cut from the films with a razor blade in dimensions of 6.4 mm $\times$ 38.1 $\times$ 0.4 mm. Sample thickness was measured with a micrometer, and sample width was measured with a millimeter ruler. The gap between the jaws at the beginning of each test was 23.0 mm. Data analysis was carried out using the Rheometrics RHIOS software.

Films made with pure lime pectins (DM65 and DM74) were somewhat brittle, but were able to be tested. Pure citrus pectin films (DM59), however, were too brittle and fragile to be tested.

An indication of film quality is obtained by evaluating the modulus of the material, which is defined as its resistance to deformation, i.e. how much stress is necessary to obtain a designated amount of strain (elongation).

The storage modulus ($E'$) is defined as the stress in phase with the strain in a sinusoidal deformation, divided by the strain. It is a measure of the energy stored and recovered per deformation cycle. It involves the reversible, or recoverable, part of the deformation.

The loss modulus ($E''$) is defined as the stress 90° out of phase with the strain in a sinusoidal deformation, divided by the strain. It is a measure of the energy dissipated or lost as heat per deformation cycle. It involves the irreversible, or irrecoverable, part of the deformation.

Figure 1:
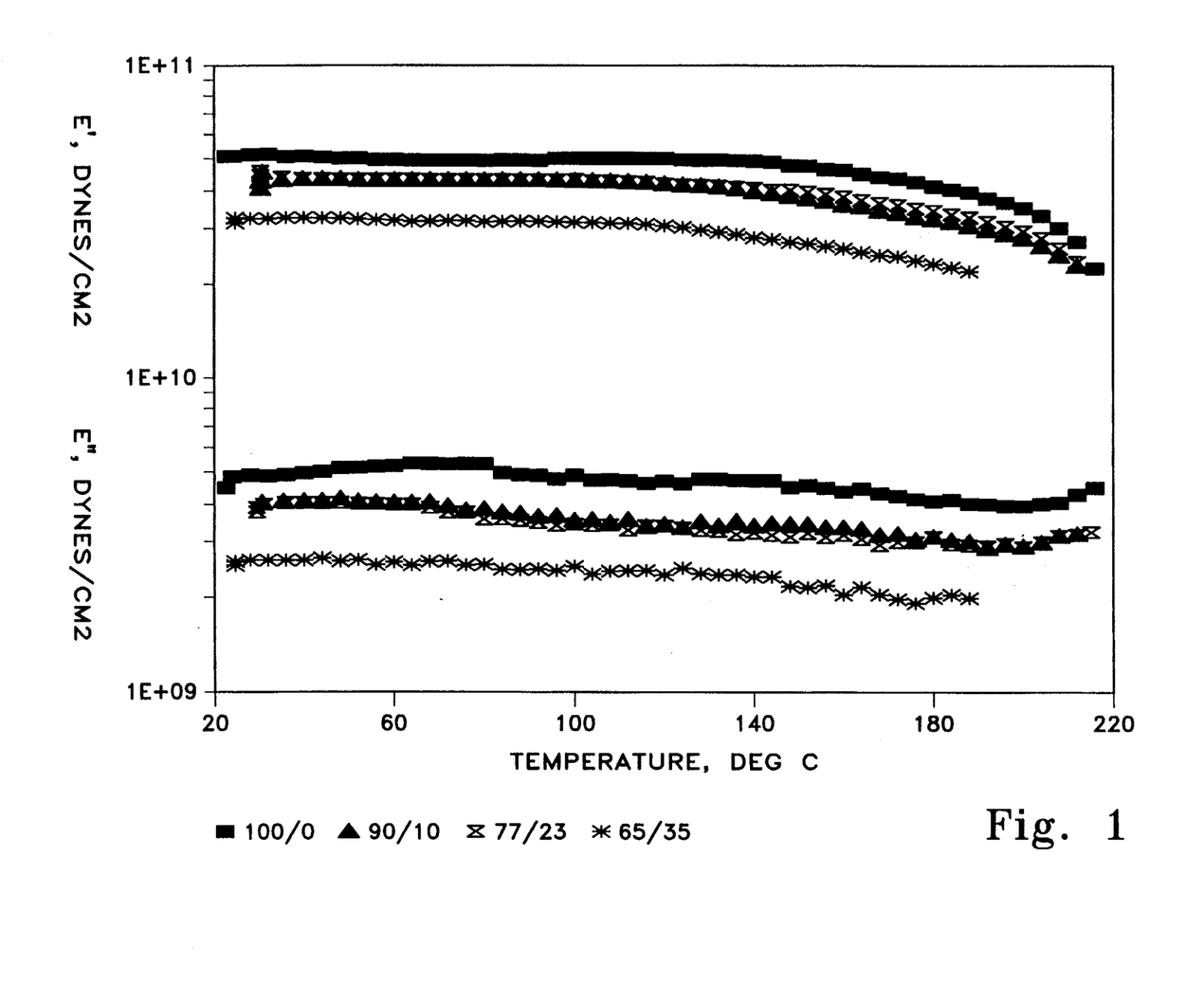
FIG. 1 shows the effects of pectin/starch ratios on storage (E′) and loss (E″) moduli for pectin DM74/Amylomaize VII blends.
Figure 2:
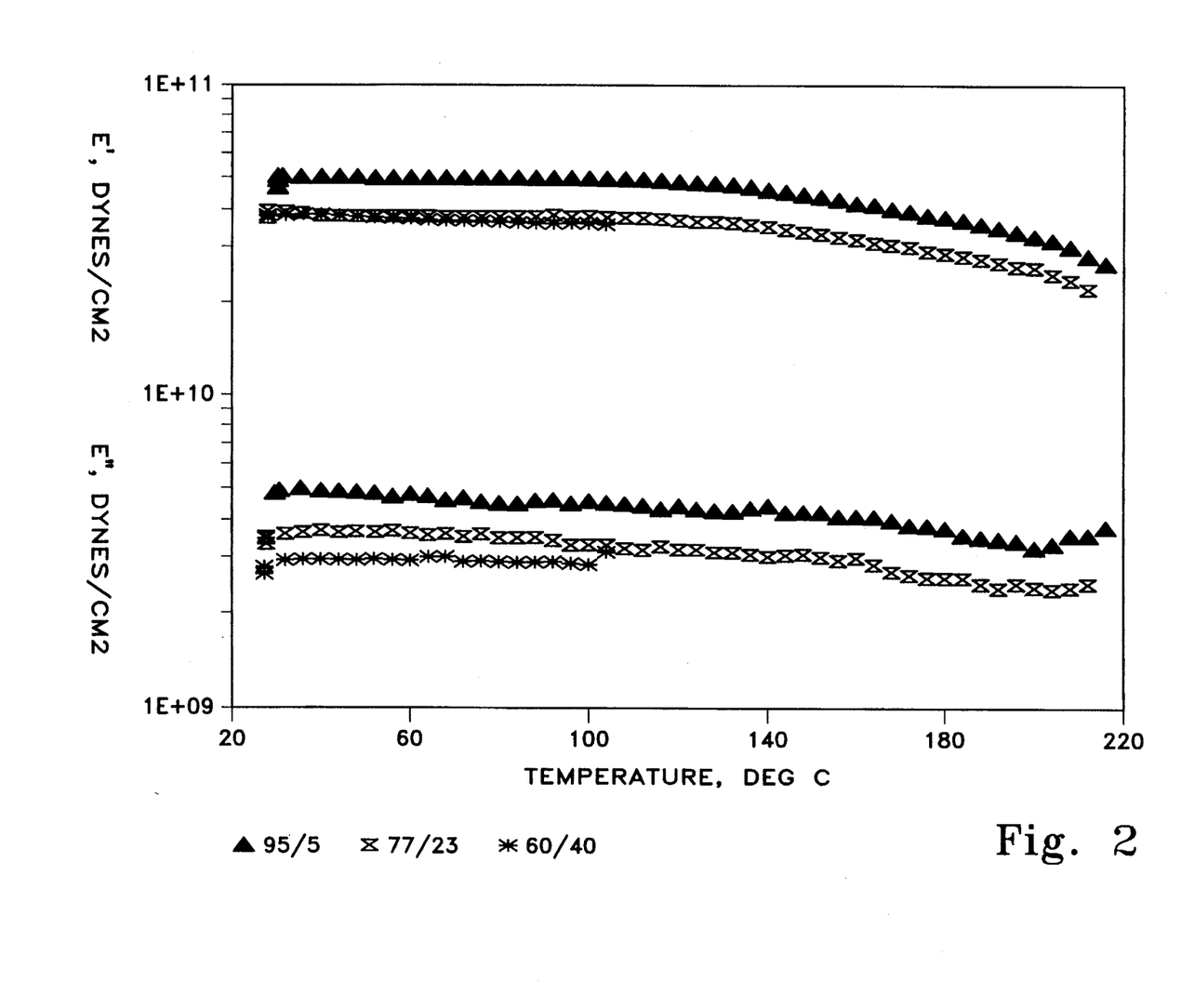
FIG. 2 shows the effects of pectin/starch ratios on storage (E′) and loss (E″) moduli for pectin DM65/Amylomaize VII blends.

Increasing amounts of starch resulted in a gradual decrease in both storage modulus ($E'$) and loss modulus ($E''$). At 35% starch and lime pectin DM74, both moduli were one third lower than for the sample containing no starch. The differences were consistent over a temperature range of 25° C. to 210° C. (see FIG. 1). Samples containing lime pectin DM65 showed similar variations at starch levels up to 40% (FIG. 2). For both samples, brittleness increased at the highest starch level.

In comparison to polyethylene films, all samples tested had $E'$ and $E''$ values approximately an order of magnitude higher at room temperature. Unlike polyethylene, pectin/starch films did not show a large decrease in modulus with increasing temperature.

The pectin and pectin/starch films all exhibited high modulus values in the range of 3 to 5 $\times 10^{10}$ dynes/cm$^2$, but had low elongations to break (1-3%) and were fairly brittle. The brittleness increased as the starch content of the films increased, and appeared to be the greatest in the samples containing pectin with lower degrees of methylation (and thus also lower molecular weight). Conformational properties of the molecule may at least partially contribute to this increase.

Films were also made utilizing a starch having approximately 100% amylopectin (Amioca, American Maize Co., Hammond Ind.), and these films were prepared and tested exactly as those prepared with high amylose Amylomaize VII. Attempts to prepare films where the starch component was 100% amylopectin failed when plasticizer was added after gelatinization. These films were generally so brittle that it was not possible to successfully remove them from the casting substrate.

The Amylomaize VII seemed to act as a second polymeric component, whereas the Amioca acted more as a non-load bearing filler. Apparently, Amioca is unable to contribute substantially to the film properties because of the high degree of chain branching in the amylopectin. This decreases its ability to act as a load bearing structure and is typical of highly branched polymers.

While the pectin/starch films had high moduli, brittleness somewhat limited their usefulness in some applications. Plasticizers were therefore added to the mixtures to obtain films which were more flexible and less susceptible to brittle failure.

Films were prepared as described supra, except that plasticizer was added instead of starch. It may be added to the system either by dissolving with the pectin or using it to aid in gelatinization of the starch. Four plasticizers were used: urea, glycerine, polyethylene glycol 300 and polyethylene glycol 1000. All of these plasticizers have been utilized in other polymer systems.

Figure 3:
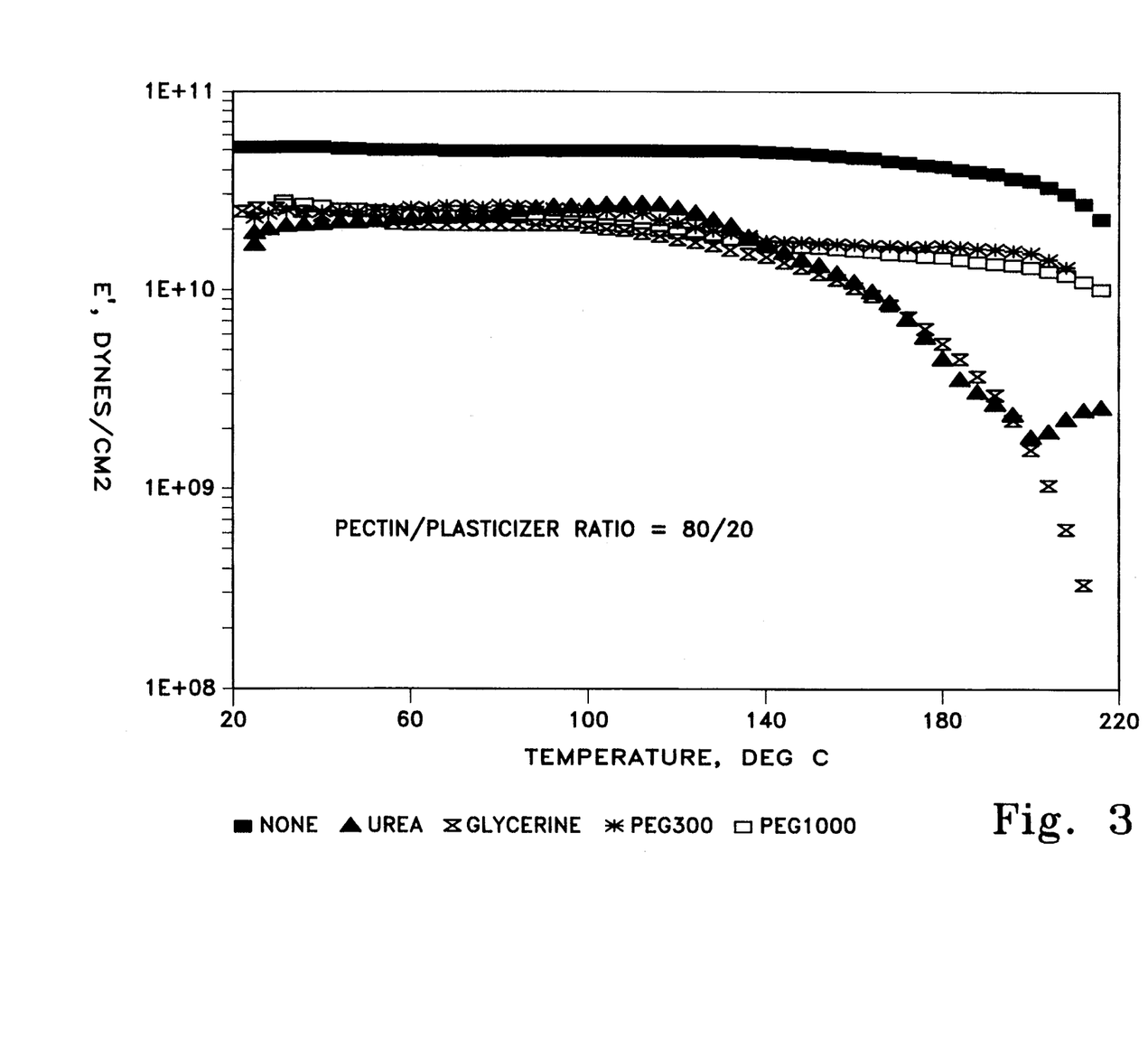
FIG. 3 shows the effect of plasticizer type on storage modulus (E′) for pectin DM74.

Urea and glycerine are relatively low in molecular weight, whereas the polyethylene glycols (PEG) are oligomers. The effect of these plasticizers at the 20 wt % level on E' of DM74 pectin is shown in FIG. 3.

All four plasticizers caused a decrease in both E' and E" over the entire temperature range, compared to unplasticized pectin. At room temperature this decrease was about 50% in all cases. Up to 130° C. there was little difference between the four materials. Above this temperature, however, the E' plots of the two PEG modified samples continued to parallel that of pure pectin, whereas the values for both the urea and glycerine plasticized samples showed a very large drop relative to pure pectin. This drop exceeded an order of magnitude. Even with the plasticizers, the modulus values of the pectins were still higher than for unplasticized polyethylene.

The loss modulus E" behaved similarly except that E" for the glycerine and urea plasticized samples diverged from the behavior of the PEG modified samples at about 170° C. rather than at 130° C.

The difference in effect on film properties between glycerine and urea on the one hand and the PEGs on the other is apparently due to different plasticizing mechanisms, attributable to differences in molecular properties. All of these materials exert a plasticizing effect by decreasing the pectin-pectin, pectin-starch and possibly starch-starch interactions. Glycerine and urea, however, also appear to act as solvents for the polymers, thus acting as more efficient plasticizers and causing a melting-type transition at lower temperatures.

To test the effects of plasticizer level on the mechanical properties of pectin/starch films, nine samples of DM74 pectin were evaluated at three different starch levels. Each of these mixtures was plasticized with three different levels of glycerine. The compositions used are shown in Table III. The results were compared to determine the effects of both starch and glycerine levels on the mechanical properties of the films.

TABLE III

| Sample | Pectin/starch ratio | % glycerine |
| --- | --- | --- |
| 1 | 95/5 | 9.0 |

TABLE III-continued

| Sample | Pectin/starch ratio | % glycerine |
| --- | --- | --- |
| 2 | 95/5 | 18.5 |
| 3 | 95/5 | 25.6 |
| 4 | 85/15 | 9.0 |
| 5 | 85/15 | 19.0 |
| 6 | 85/15 | 26.6 |
| 7 | 75/25 | 9.4 |
| 8 | 75/25 | 19.2 |
| 9 | 75/25 | 27.7 |

No trend was seen in the effect of starch level on the breaking strength and elongation to break of the films. The films containing 9% glycerine had elongations to break of about 1% and breaking strengths of about $1.7 \times 10^2$ dynes/cm$^2$. Those with glycerine contents of 19 and 26% had breaking strengths of about $3.5 \times 10^8$ dynes/cm$^2$ and elongations of 2-3%.

Figure 4:
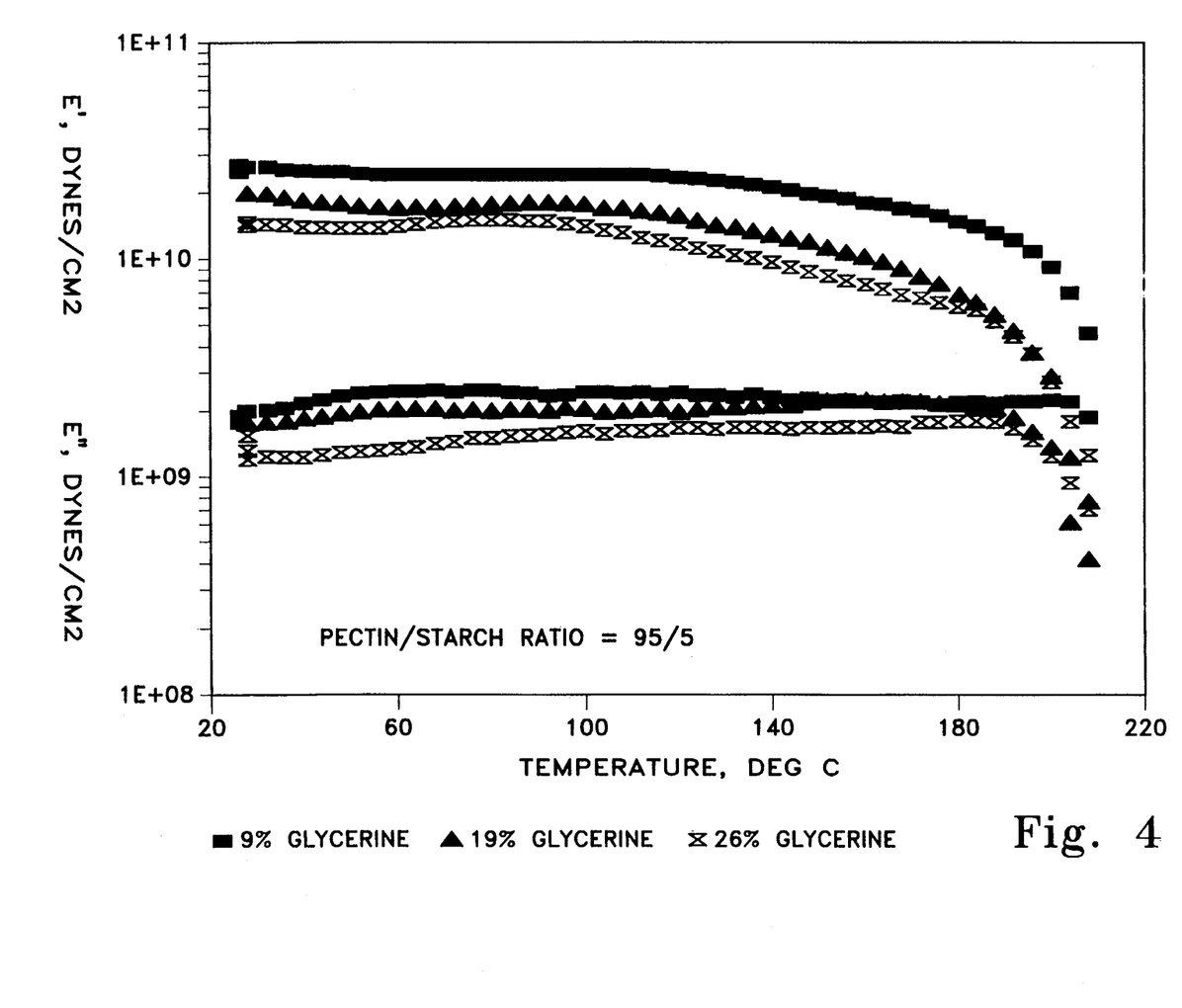
FIG. 4 shows the effect of glycerine level on storage (E′) and loss (E″) moduli for 95/5 blends of pectin DM74 and Amylomaize VII.
Figure 5:
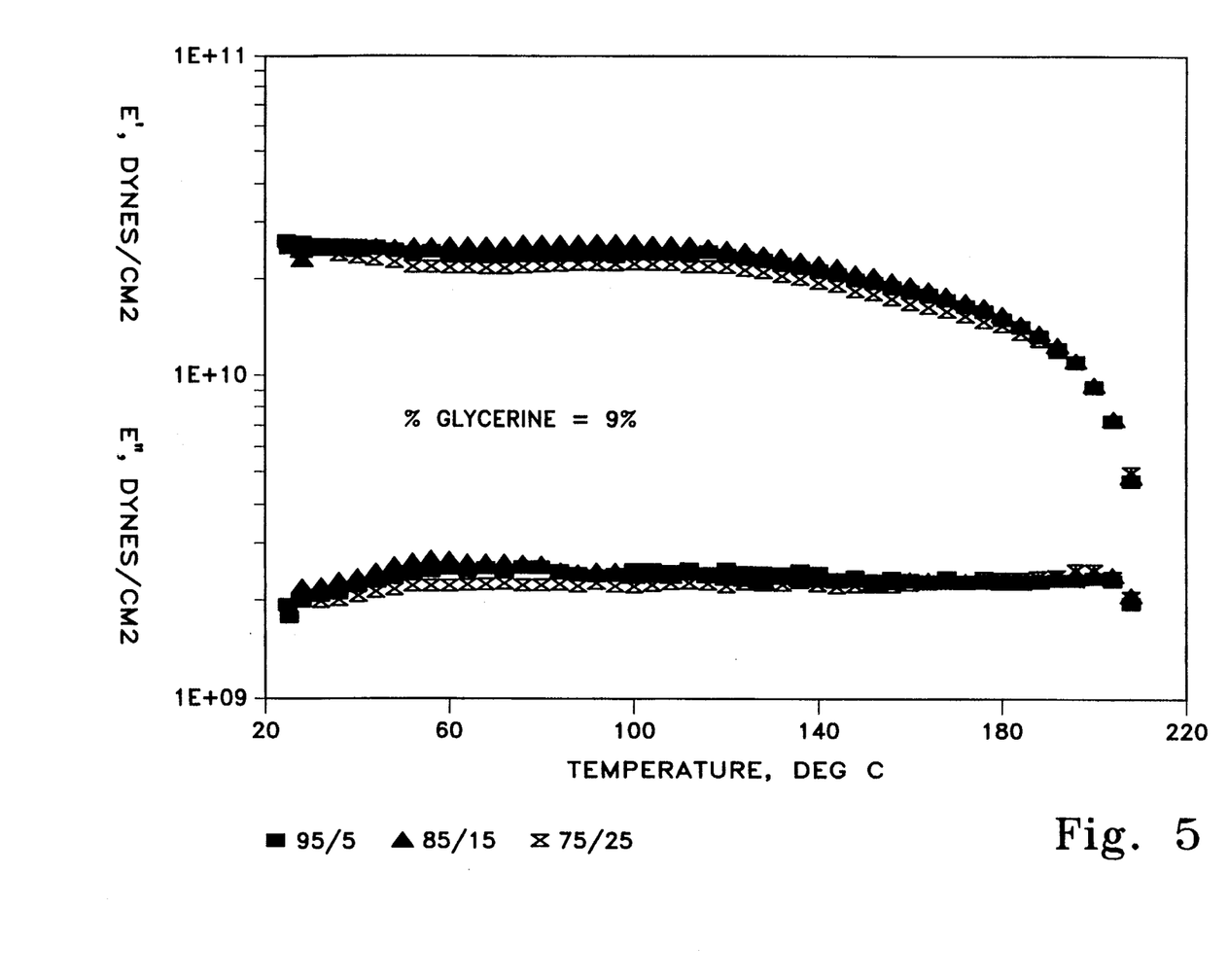
FIG. 5 shows the effect of starch level on storage (E′) and loss (E″) moduli of pectin DM74 blends at constant glycerine level (9%).

FIG. 4 shows typical behavior for the effect of glycerine level on E' and E" at constant pectin/starch ratio, while FIG. 5 shows typical behavior for the effect of varying the pectin/starch ratio at constant glycerine level.

All of the samples showed a typical decrease in modulus with increasing temperature, with the rate of decrease becoming more rapid at higher temperatures, particularly above 185° C. Pure pectin and the pectin/starch blends with no glycerine did not show this decline until about 200° C. In general, both E' and E" curves were shifted to lower values with increasing glycerine level at constant pectin/starch ratio. It was noted, however, that glycerine affected E" to a smaller extent at the higher starch levels, and seemed to have no effect below 180° C. with the 75/25 pectin/starch ratio.

Over the range of starch used, there was essentially no effect of the pectin/starch ratio seen on the film properties at constant glycerine level. This held true for both E' and E" and may be due to the relatively limited range of starch concentrations used.

Figure 6:
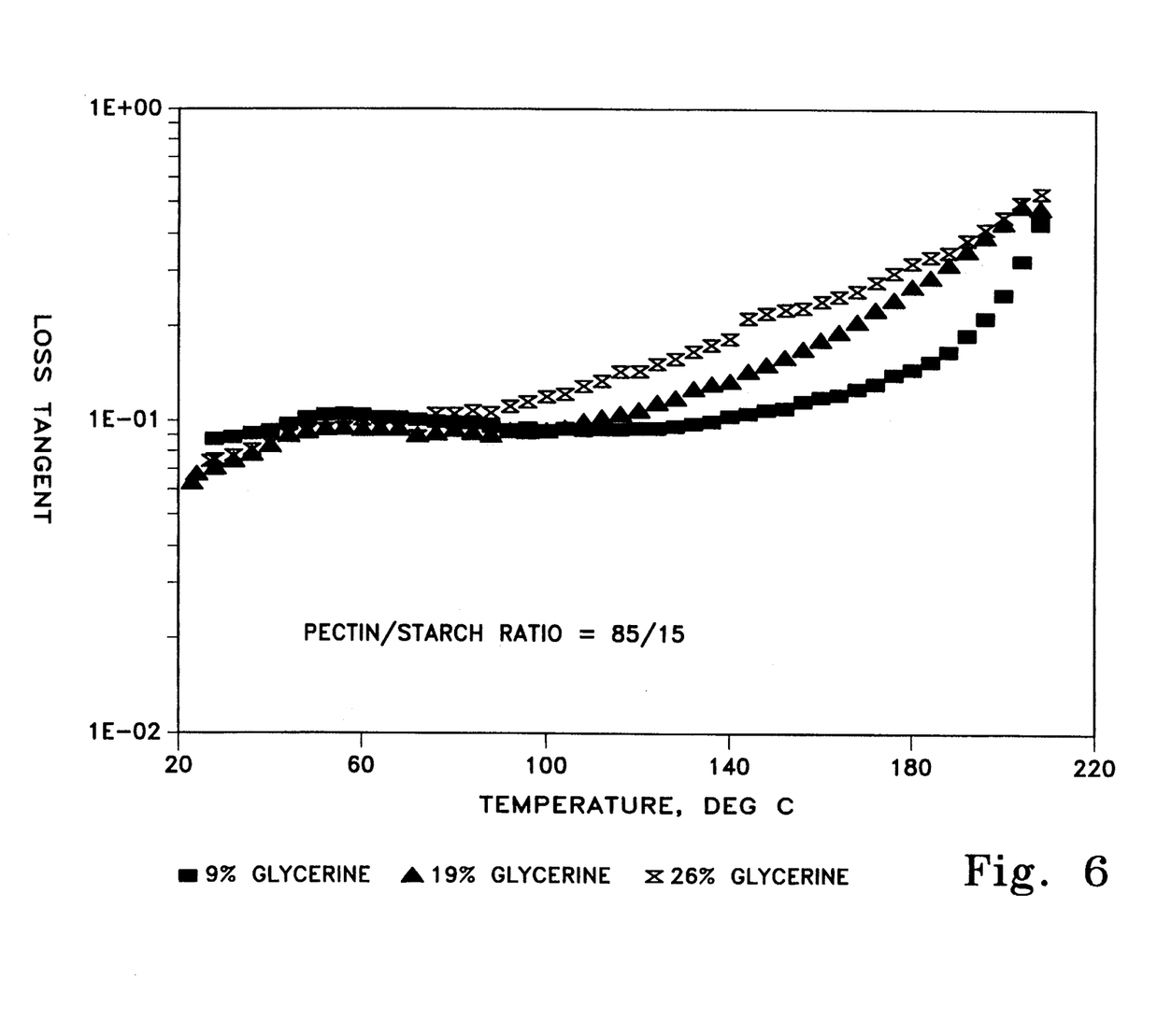
FIG. 6 shows the effect of glycerine level on loss tangent (tan delta) of pectin DM74 blends at constant pectin/starch ratio ($^{85}/15$).

The loss tangent (tan delta, $E''/E'$) represents the relative contribution of the elastic (E') and the viscous (E") components of the complex modulus in the material properties. The effect of increasing the glycerine level at constant pectin/starch ratio was to increase tan delta, particularly at temperatures above 100° C. This represents an increasing relative contribution by the viscous component of the material. A typical example of this behavior is shown in FIG. 6. Changing the pectin/starch ratio at constant glycerine content had little or no effect.

Figure 7:
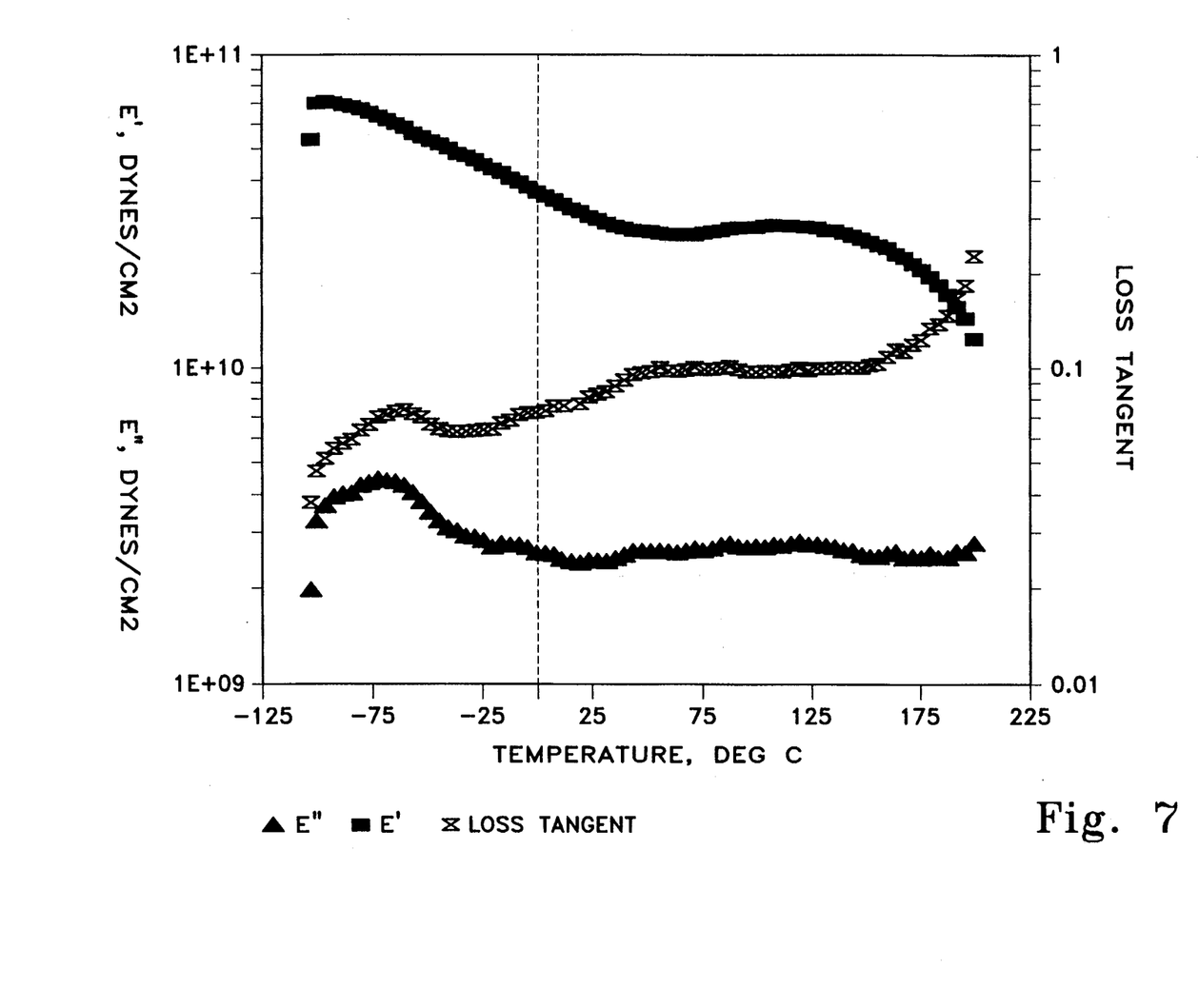
FIG. 7 shows the effect of temperatures from $-125°$ C. to 225° C. on storage (E′) and loss (E″) moduli and loss tangent on blends of pectin DM74—Amylomaize VII—Glycerine, 9.4% Glycerine, 75/25 pectin/starch ratio.
Figure 8:
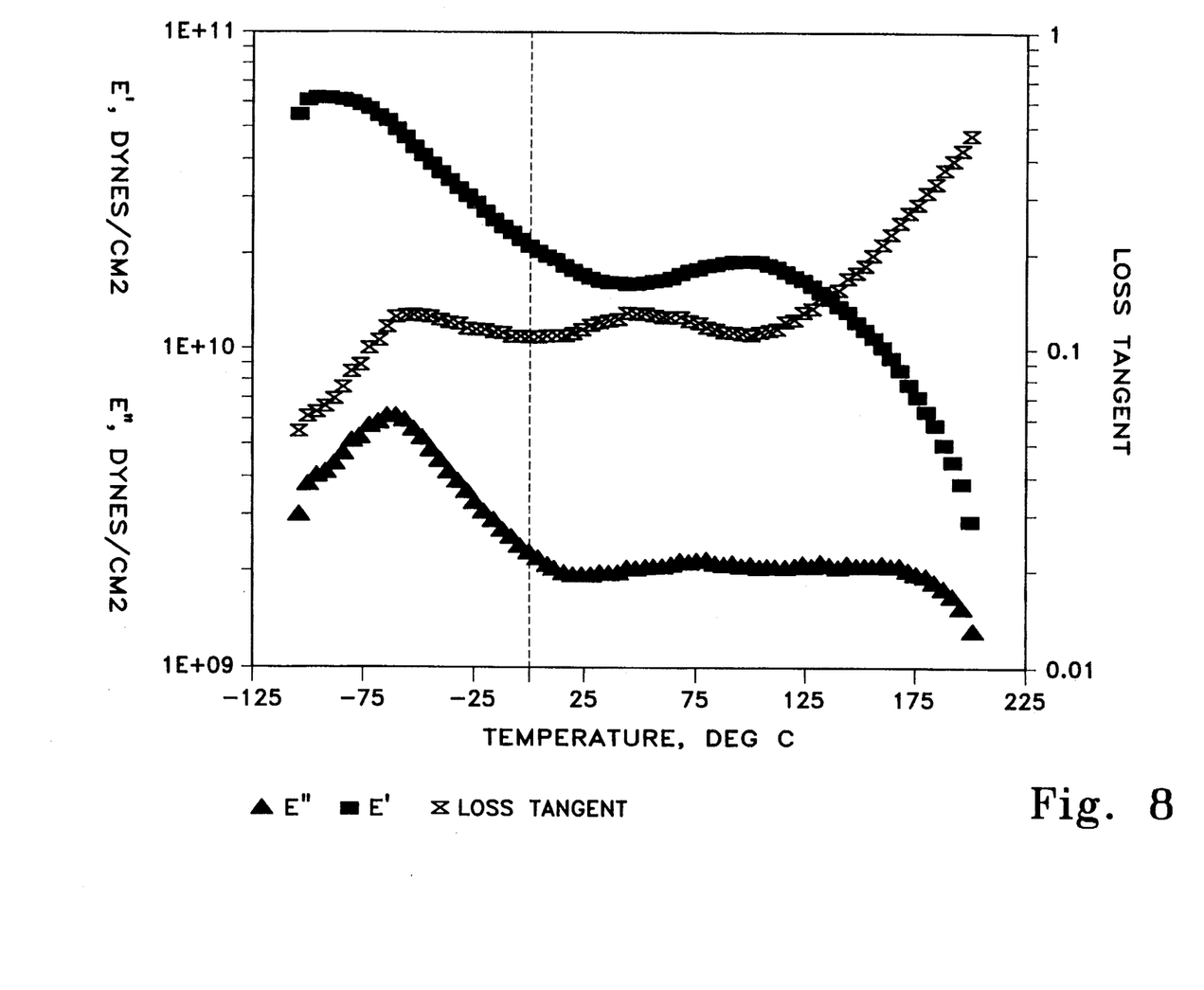
FIG. 8 shows the effect of temperatures from $-125°$ C. to 225° C. on storage (E′) and loss (E″) moduli and loss tangent on blends of pectin DM74—Amylomaize VII—Glycerine, 19.2% Glycerine, 75/25 pectin/starch ratio.
Figure 9:
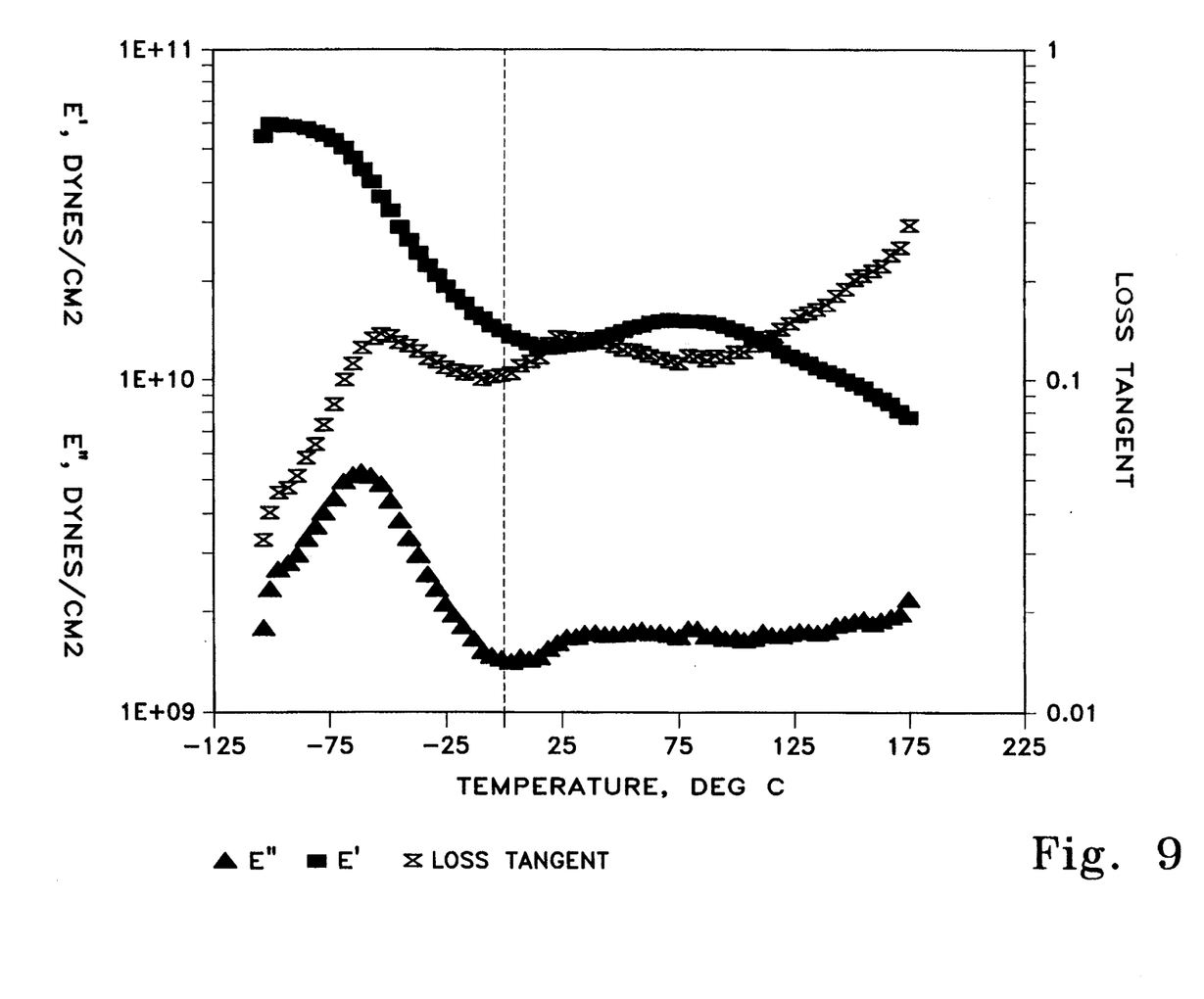
FIG. 9 shows the effect of temperatures from $-125°$ C. to 225° C. on storage (E′) and loss (E″) moduli and loss tangent on blends of pectin DM74—Amylomaize VII—Glycerine, 27.7% Glycerine, 75/25 pectin/starch ratio.

From room temperature to +200° C. no thermal transitions were apparent in any of the materials analyzed. With some samples a small broad hump was seen in the vicinity of 60° C., possibly attributable to water. To determine if sub-ambient melting or glass transitions might be present, samples plasticized with three glycerine levels and a pectin/starch ratio of 75/25 were tested from −100° C. to +200° C. The results of these experiments are shown in FIGS. 7, 8 and 9.

For all three samples a very distinct transition was observed at about −60° C. The area under the peak increased linearly with increasing glycerine content, indicating that the transition involved the glycerine. The temperature at which the transition occurred increased by 6 to 8 degrees when the glycerine content increased from 9 to 19%. No further change was observed in the sample plasticized with 27% glycerine.

After testing, the intrinsic viscosities of the three pectins were run and compared with the original values shown in Table 1. Those values were essentially the same as the original values, indicating that the pectin samples had not degraded with time (see Table IV). The higher values found in water compared to 0.05M NaCl indicate the presence of increased aggregation in water compared to an ionic solution.

TABLE IV

| Pectin | Intrinsic Viscosity, dl/g | |
| --- | --- | --- |
|  | 0.05 M NaCl | $H_2O$ |
| DM59 | 2.1 | 8.4 |
| DM65 | 3.7 | 9.1 |
| DM74 | 5.3 | 12.8 |

The level of glycerine present in the films had a noticeable effect on the tenacity and elongation to break of the films. Both elongation and tenacity roughly doubled as the glycerine content was raised from 9 to 19%. No further increase was seen at 27% glycerine. While a definite plasticizing effect is indicated by these results, the highest elongation was found to be 3% thereby indicating that significantly higher plasticizer levels would be required for larger increases in elongation to break.

Thus, it can be seen that films can be made from pectin, starch and, optionally, plasticizers, which span the range from very brittle to highly flexible. By controlling the composition of the films, widely varying properties can be obtained. Great variations in flexibility, tack and adhesiveness are possible, making pectin-based blends very versatile materials for a wide range of consumer and industrial applications.

We claim:

1. A film consisting essentially of a blend of pectin and starch, wherein said pectin and said starch are present in amounts effective for the formation of the film.

2. The film of claim 1, wherein said pectin has a high molecular weight, large radius of gyration, high degree of methyl esterification and high intrinsic viscosity at an ionic strength of at least 0.05.

3. The film of claim 2, wherein said molecular weight is at least about 100,000, said radius of gyration is at least about 25 nanometers, said degree of methyl esterification is at least about 50%, and said intrinsic viscosity is at least about 2.1 dl/g.

4. The film of claim 1, wherein said starch is high amylose starch.

5. The film of claim 4, wherein said amylose is at least about 40% of the starch composition.

6. The film of claim 1, wherein said blend further consisting essentially of an effective amount of a plasticizer.

7. The film of claim 6, wherein said plasticizer is selected from the group consisting of poly(alkylene glycols), urea and glycerine.

8. The film of claim 7, wherein the plasticizer is glycerine or urea.

9. The film of claim 8, wherein the plasticizer is glycerine.

10. A method of making a film, said method comprising,
   a) blending pectin with gelatinized starch in amounts effective for the formation of the film,
   b) casting the blend on a plate, such that a film is formed,
   c) allowing said film to dry, and
   d) removing the film from the plate.

11. The method of claim 10, said method further comprising blending plasticizer with the pectin/starch blend in step a).

12. A film consisting essentially of a blend of pectin and plasticizer, wherein said pectin and said plasticizer are present in amounts effective for the formation of the film.

13. The film of claim 12, wherein said pectin has a high molecular weight, large radius of gyration, high degree of methyl esterification and high intrinsic viscosity at an ionic strength of at least 0.05.

14. The film of claim 13, wherein said molecular weight is at least about 100,000, said radius of gyration is at least about 25 nanometers, said degree of methyl esterification is at least about 50% and said intrinsic viscosity is at least about 2.1 dl/g.

15. The film of claim 12, wherein the plasticizer is selected from the group consisting of poly(alkylene glycols), urea and glycerine.

16. The film of claim 15, wherein the plasticizer is glycerine or urea.

17. The film of claim 16, wherein the plasticizer is glycerine.

* * * * *